United States Patent [19]

Jacobs

[11] Patent Number: 5,426,737
[45] Date of Patent: Jun. 20, 1995

[54] DIRECT MEMORY ACCESS FOR DATA TRANSFER WITHIN AN I/O DEVICE

[75] Inventor: Mick R. Jacobs, Auburn, Calif.

[73] Assignee: Hewlett-Packard Company, Palo Alto, Calif.

[21] Appl. No.: 66,602

[22] Filed: May 24, 1993

Related U.S. Application Data

[63] Continuation of Ser. No. 683,944, Apr. 11, 1991, abandoned.

[51] Int. Cl.⁶ ............................................. G06F 13/00
[52] U.S. Cl. ..................................... 395/275; 395/425;
364/DIG. 1; 364/238.2; 364/238.3; 364/238.4;
364/239.5; 364/240; 364/242.3; 364/243.5;
364/245.5
[58] Field of Search ............... 395/275, 250, 425, 325,
395/375, 725, 800; 340/825.52; 370/85.6, 85.13

[56] References Cited

U.S. PATENT DOCUMENTS

| | | | |
|---|---|---|---|
| 4,441,162 | 4/1984 | Lillie ..................................... | 395/700 |
| 4,716,522 | 12/1987 | Funabashi ............................ | 395/250 |
| 4,777,591 | 10/1988 | Chang et al. ......................... | 395/800 |
| 4,780,813 | 10/1988 | Gerety et al. ........................ | 395/425 |
| 4,797,812 | 1/1989 | Kihara ................................. | 395/400 |
| 4,821,180 | 4/1989 | Gerety et al. ........................ | 395/275 |
| 4,821,185 | 4/1989 | Esposito .............................. | 395/275 |
| 4,866,421 | 9/1989 | Szczepanek .................... | 340/825.52 |
| 4,878,166 | 10/1989 | Johnson et al. ..................... | 395/425 |
| 4,878,173 | 10/1989 | Goekjian ............................. | 395/425 |
| 4,881,163 | 11/1989 | Thomas et al. ..................... | 395/250 |
| 4,882,702 | 11/1989 | Struger et al. ...................... | 395/275 |
| 4,926,324 | 5/1990 | Yamamoto et al. ................. | 395/275 |
| 4,975,832 | 12/1990 | Saito et al. .......................... | 395/425 |
| 4,994,963 | 2/1991 | Rorden et al. ...................... | 395/325 |
| 5,003,465 | 3/1991 | Chisholm et al. ................... | 395/275 |
| 5,058,005 | 10/1991 | Culley ................................. | 395/425 |
| 5,088,090 | 2/1992 | Yacoby ........................... | 370/85.13 |
| 5,097,437 | 3/1992 | Larson ................................ | 395/775 |
| 5,103,446 | 4/1992 | Fischer .............................. | 370/85.1 |
| 5,109,332 | 4/1992 | Culley ................................. | 395/325 |
| 5,117,289 | 5/1992 | Farley et al. ........................ | 358/140 |
| 5,119,487 | 6/1992 | Taniai et al. ........................ | 395/425 |
| 5,125,084 | 6/1992 | Begunn et al. ...................... | 395/375 |
| 5,130,981 | 7/1992 | Murphy ............................ | 370/85.6 |
| 5,191,653 | 3/1993 | Banks et al. ........................ | 395/275 |

*Primary Examiner*—Jack B. Harvey
*Assistant Examiner*—Ayaz R. Sheikh

[57] ABSTRACT

Within a computing system an input/output device connects an input/output bus to an external data port. Data is transferred between the input/output bus and the external data port. A controller within the input/output device transfers data between the external data port and an internal memory. Direct memory access circuitry within the input/output device transfers data between the internal memory and the input/output bus in synchronization with data transfer across the input/output bus. Data transfers to and from the internal memory are arbitrated so that the controller does not transfer data between the external data port and the internal memory simultaneous to the direct memory access circuitry transferring data between the internal memory and the input/output bus.

10 Claims, 7 Drawing Sheets

DIRECT MEMORY ACCESS FOR DATA TRANSFER WITHIN AN I/O DEVICE

This application is a continuation of application Ser. No. 07/683,944, filed Apr. 11, 1991, now abandoned.

BACKGROUND

The present invention concerns the transfer of data between ports in an input/output (I/O) device.

In an I/O device, such as a local area network adaptor card, data is transferred between a data port interfacing a host computer and a data port which receives and transmits I/O data.

Data flow within the I/O device is conventionally managed by a controller. For example, in a local area network adaptor card which interfaces an Ethernet Local Area Network to an Extended Industry Standard Architecture (EISA) bus, a DP8390 LAN Controller available from National Semiconductor, having a business address of 2900 Semiconductor Drive, Santa Clara Calif. 95052, may be used. The I/O device may be designed so that the controller manages data transfers in one of a number of ways.

For example, the controller may directly move data between a local area network (LAN) and a bus port. This solution, however, has several potential disadvantages. For example, most available controllers are not able to transfer data at a sufficiently high rate so the local area network and the bus are able to transfer data at maximum performance levels. This disadvantage is increased, for example when the controller transfers data in a word size which is smaller than the word size used by the bus. For instance, the DP8390 LAN controller transfers data in 16-bit words while the EISA bus performs 32-bit word transfers. Further using a controller to directly transfer data may incur significant software overhead in control software for the controller.

In order to increase bus performance, a first-in-first-out (FIFO) memory may be added to the bus interface. The controller may then queue data within the FIFO which is transferred on the bus. This allows for increased bus performance but increases data latency within the I/O device. Further, FIFO memories are expensive and consume a large area of the circuit board used in the implementation of the I/O device. Further, control circuits for FIFO memories can be complex. Also, there is still significant software overhead required for the controller to directly transfer data to the FIFO memories.

Alternately, the I/O device may use dual port memories and a memory map shared by the I/O device and the host computer system. However, dual port memories are extremely expensive and consume a large area of the circuit board used in the implementation of the I/O device. Further, shared memory maps are complex for configuring systems and require additional circuit overhead to decode addresses.

SUMMARY OF THE INVENTION

In accordance with the preferred embodiment of the present invention, within a computing system an input/output device connects an input/output bus to an external data port. Data is transferred between the input/output bus and the external data port. A controller within the input/output device transfers data between the external data port and an internal memory. Direct memory access circuitry within the input/output device transfers data between the internal memory and the input/output bus in synchronization with data transfer across the input/output bus.

Data transfers to and from the internal memory are arbitrated so that the controller does not transfer data between the external data port and the internal memory simultaneous to the direct memory access circuitry transferring data between the internal memory and the input/output bus. The arbitrating, for example, is done by an arbitrator state machine.

When both the direct memory access circuitry and the controller are not requesting access to the internal memory, the arbitrator grants to the direct memory access circuitry access to the internal memory. When the controller requests access to the internal memory, the arbitrator grants the controller access to the internal memory after allowing for delay sufficient for the direct memory access circuitry to complete any current data transfer between the internal memory and the input/output bus.

The writing of data from the input/output bus to the internal memory is controlled by a write controller within the input/output device. The write controller is, for example, a state machine. During a write operation, the write controller sends to the input/output bus a request to start a data transfer. When the input/output bus grants the request to start a data transfer and the arbitrator is granting to the direct memory access circuitry access to the internal memory, the write controller oversees the performance of a burst data transfer of data from the input/output bus to the internal memory. When the input/output bus grants the request to start a data transfer and the arbitrator is not granting to the direct memory access circuit access to the internal memory, the write controller waits for the arbitrator to grant to the direct memory access circuit access to the internal memory. When the arbitrator grants to the direct memory access circuit access to the internal memory, the write controller transfer oversees the transfer of a single data word to the internal memory from a holding register within the input/output device. The holding register is connected to the input/output bus and receives the single data word from the input/output device with the grant of the input/output bus to start a data transfer.

The reading of data from the internal memory to the input/output bus is controlled by a read controller within the input/output bus. The read controller is, for example, a state machine. During a read operation the read controller oversees the transfer of a single data word from the internal memory to a holding register within the input/output device. The holding register is connected to the input/output bus. The read controller then sends to the input/output bus a request to start a data transfer. When the input/output bus grants the request to start a data transfer and the arbitrator is granting to the direct memory access circuitry access to the internal memory, the read controller oversees the performance of a burst data transfer of data from the internal memory to the input/output bus beginning with the single data word. When the input/output bus grants the request to start a data transfer and the arbitrator is not granting to the direct memory access circuit access to the internal memory, only the single data word is transferred from the holding register to the input/output bus.

The synchronous direct memory access transfers within the input/output device which are synchronous with data transfer across the input/output device offer distinct advantages over prior art devices. When a controller is too slow to perform high speed data transfers both at a front plane and a back plane of an I/O device, the presently disclosed use of direct memory access within an I/O device offers a means by which an efficient flow of data may be achieved without the use of more expensive memory devices such as first-in-first-out memories, or dual port memories.

DESCRIPTION OF THE PREFERRED EMBODIMENT

Figure 1:
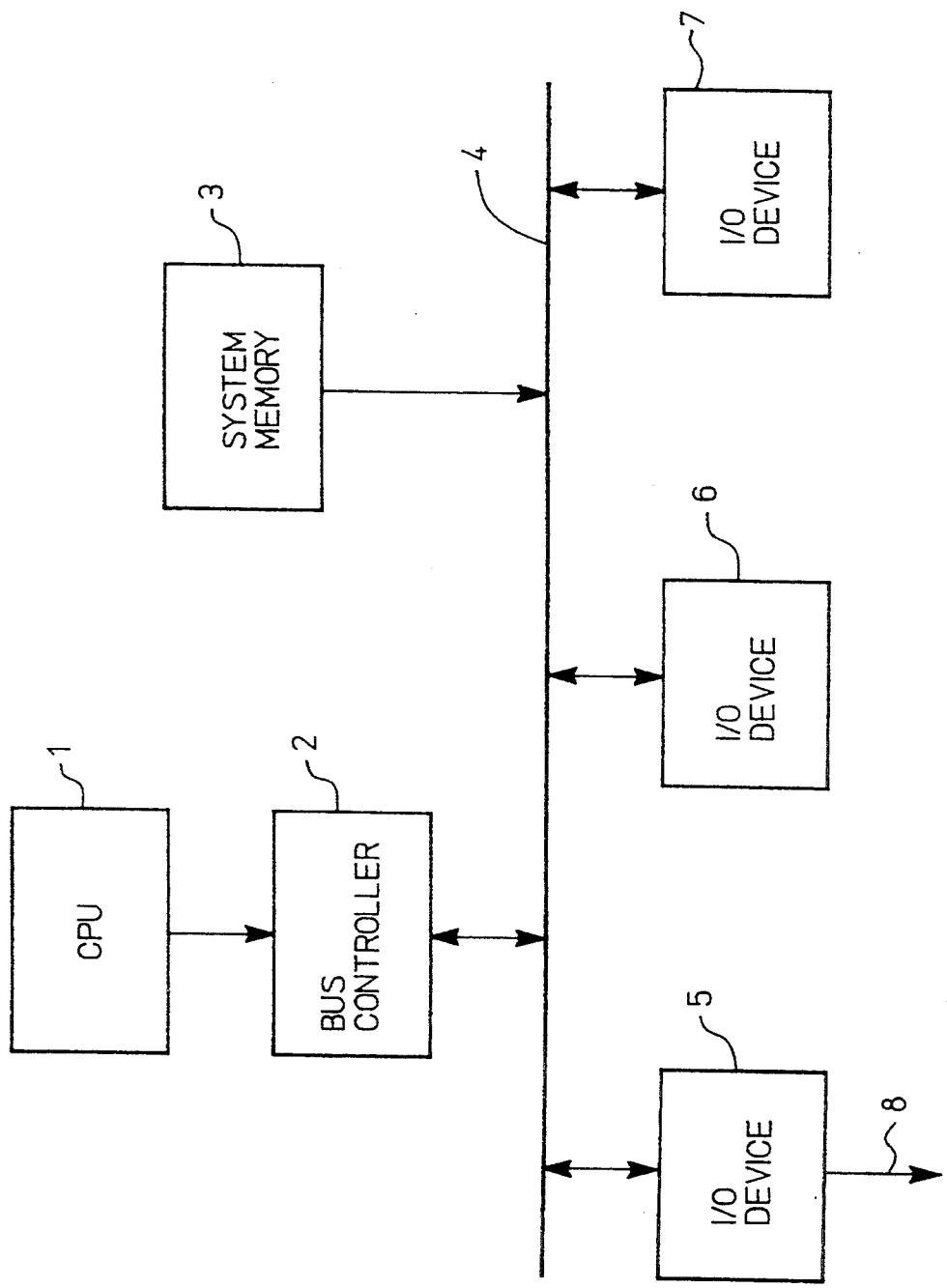
FIG. 1 shows a central processing unit, a system memory and input/output devices connected to a bus.

In FIG. 1, a central processing unit (CPU) of a host computer is shown connected to a bus 4 through a bus controller 2. The host is, for example, a personal computer such as is available from Hewlett Packard Company having a business address of 3000 Hanover Street, Palo Alto, Calif. 94304. Bus 4 is, for example a bus which conforms to the Extended Industry Standard Architecture (EISA). The EISA Specification may be obtained by BCPR Services, Inc. which has a business address of 1400 L Street Northwest, Washington, D.C. 20005.

Shown connected to bus 4 are an I/O device 5, an I/O device 6 and an I/O device 7. I/O device 5 is, for example, an Ethernet local area network (LAN) adaptor card. I/O device 5 serves as an interface between an Ethernet LAN 8 and EISA bus 4.

Figure 2:
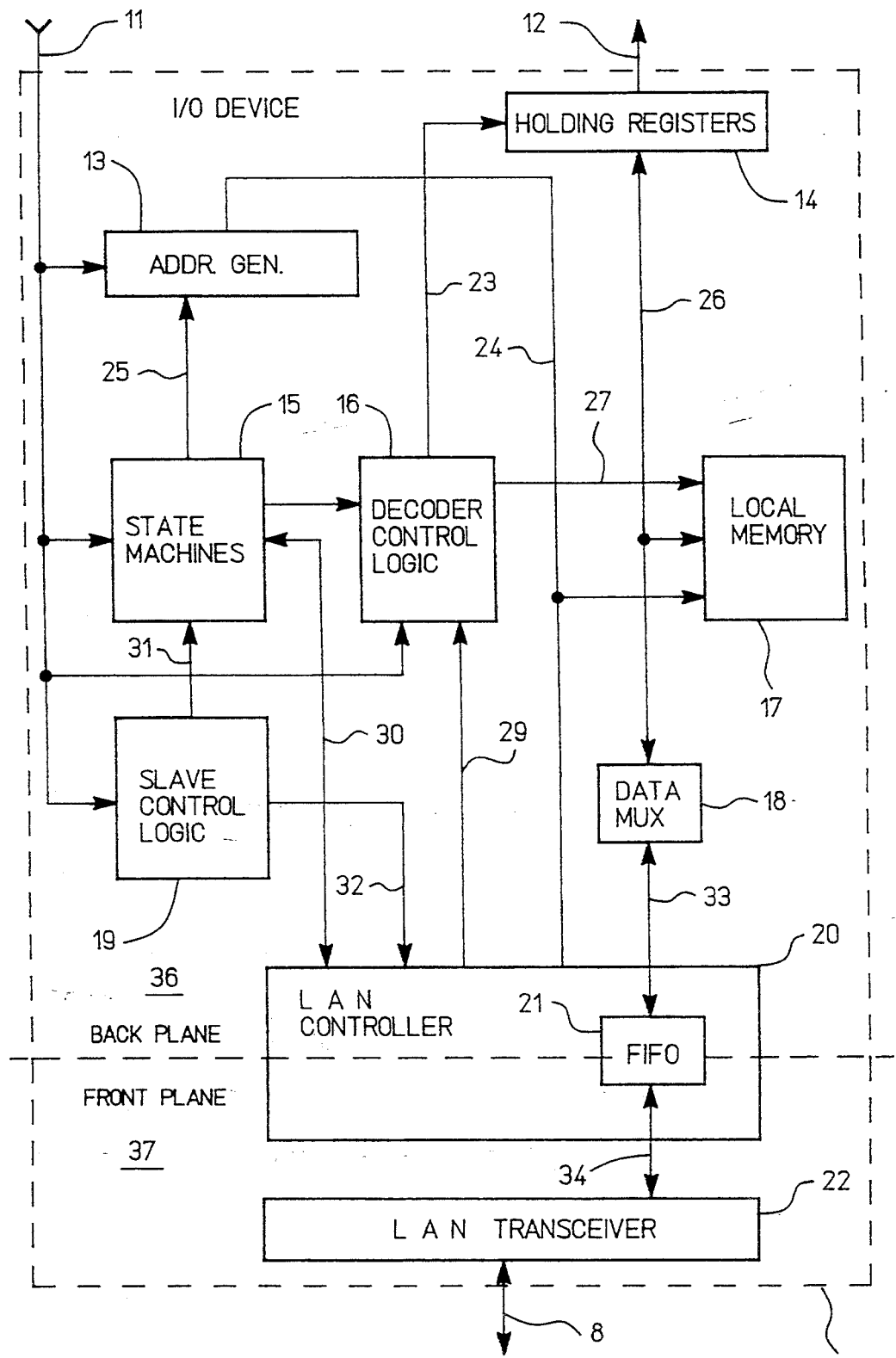
FIG. 2 shows a block diagram of an input/output device for connecting an Ethernet Local Area Network with an EISA bus in accordance with the preferred embodiment of the present invention.

In FIG. 2, a block diagram of I/O device 5 is shown. I/O device 5 has a front plane 37 and a back plane 36. Logic circuits within Front plane 37 are used in data transfers to and from Ethernet LAN 8. Logic circuits within back plane 36 are used to transfer data to and from EISA bus 4. An LAN controller 20 is logically in both front plane 37 and back plane 36. LAN controller 20 is, for example, a DP8390 LAN Controller available from National Semiconductor.

LAN controller 20 receives data from and transmits data to Ethernet LAN 8 through an LAN transceiver 22. Data transferred to and from LAN transceiver 22 along a data path 34 is stored by LAN controller 20 in a first-in-first-out (FIFO) memory 21 within LAN controller 20.

In backplane 36, data is transferred between FIFO memory 21 and local memory data bus 26 through a data multiplexer 18. Data multiplexer 18 is necessary because in the preferred embodiment of the present invention, local memory data bus 26 is a 32-bit parallel data bus while data path 33 from FIFO memory 21 is only 16 bits wide. Data multiplexer 18, therefore, is used to interface between data path 33 and local memory data bus 26. Data multiplexer 18 may be, for example, two octal transceivers available as part number 74F245 from Signetics Company, having a business address of 811 E. Arques, Sunnyvale, Calif. 94088-3409.

LAN controller 20 generates addresses on a local memory address bus 24 in order to transfer data between FIFO 21 and local memory 17. Local memory 17 is, for example, a 16K×32-bit memory which is implemented, for example, by four 32K×8-bit static RAMs such as those available as part number TC55257-70 from Toshiba America, Inc., having a business address of 15621 Red Hill Ave., Suite 205, Tustin, Calif. 92682. Local memory 17 may be more efficiently implemented using four 16K×8 bit static RAMs if such are available.

Slave control logic 19 decodes addresses from EISA bus 4. Addresses from EISA bus 4 are included as part of control lines 11 from EISA bus 4. Upon decoding of addresses from EISA bus 4, slave control logic 19 determines whether control signals on control lines 11 are addressing I/O device 5. In response to control signals from EISA bus 4 on control lines 11, slave control logic generates enable signals and other control signals to logic circuits within I/O device 5. For example, slave control logic 19 forwards control signals to LAN controller 20 through a control signal path 32, and slave control logic 19 forwards control signals to state machines 15 through control signal path 31. For more information on EISA bus control signals and their decoding, the EISA Specification should be consulted.

Holding registers 14 are used to buffer data transferred between I/O device 5 and EISA bus 4. Holding registers 14 may be, for example, eight octal D flip-flop registers available as part number 74F574 from Signetics Company. Four of the eight octal D flip-flop registers are used for data reads from I/O device 5, and four of the eight octal D flip-flop registers are used for data writes to I/O device 5.

State machines 15 are used to control direct memory access (DMA) data transfers between local memory 17 and holding registers 14. Signals from state machines 15 are translated/decoded by decoder control logic 16. In response to signals from state machine 15, decoder control logic provides strobe signals to local memory 17 along a control signal path 27 and provides clock signals to holding registers 14 along control signal path 23. Decoder control logic 16 uses BClk from control lines 11 of EISA bus 4 to control transfers between holding registers 14 and local memory 17. This allows I/O device 5 to synchronize data transfers between data lines 12 of EISA bus 4 and local memory 17 during the burst mode of EISA bus 4. For more information on timing control signals for EISA burst mode see the EISA Specification. Decoder control logic 16 also responds to control signals from LAN controller 20 on control lines 29.

An address generator 13 provides addresses onto address bus 24 during DMA transfers between local memory 17 and holding registers 14. Address generator 13 is controlled by state machines 15 through control lines 25. Before a transfer begins over bus 4, CPU 1 through bus controller 2 and control lines 11 of EISA bus 4 sets up a DMA transfer between holding registers 14 and local memory 17 by loading address generator 13 with an address in local memory 17. Address generator 14 then increments this address during DMA transfers in response to a control signal from state machines 15 on control lines 25.

In the preferred embodiment of the present invention, address generator 13 is implemented using programmable logic arrays. However, address generator 13 may also be implemented using commercially available parts. For example address generator 13 may be implemented using two Eight-Bit Bidirectional Binary Counters (3-state) available as part number 74F7799 from Signetics Company.

Figure 3:
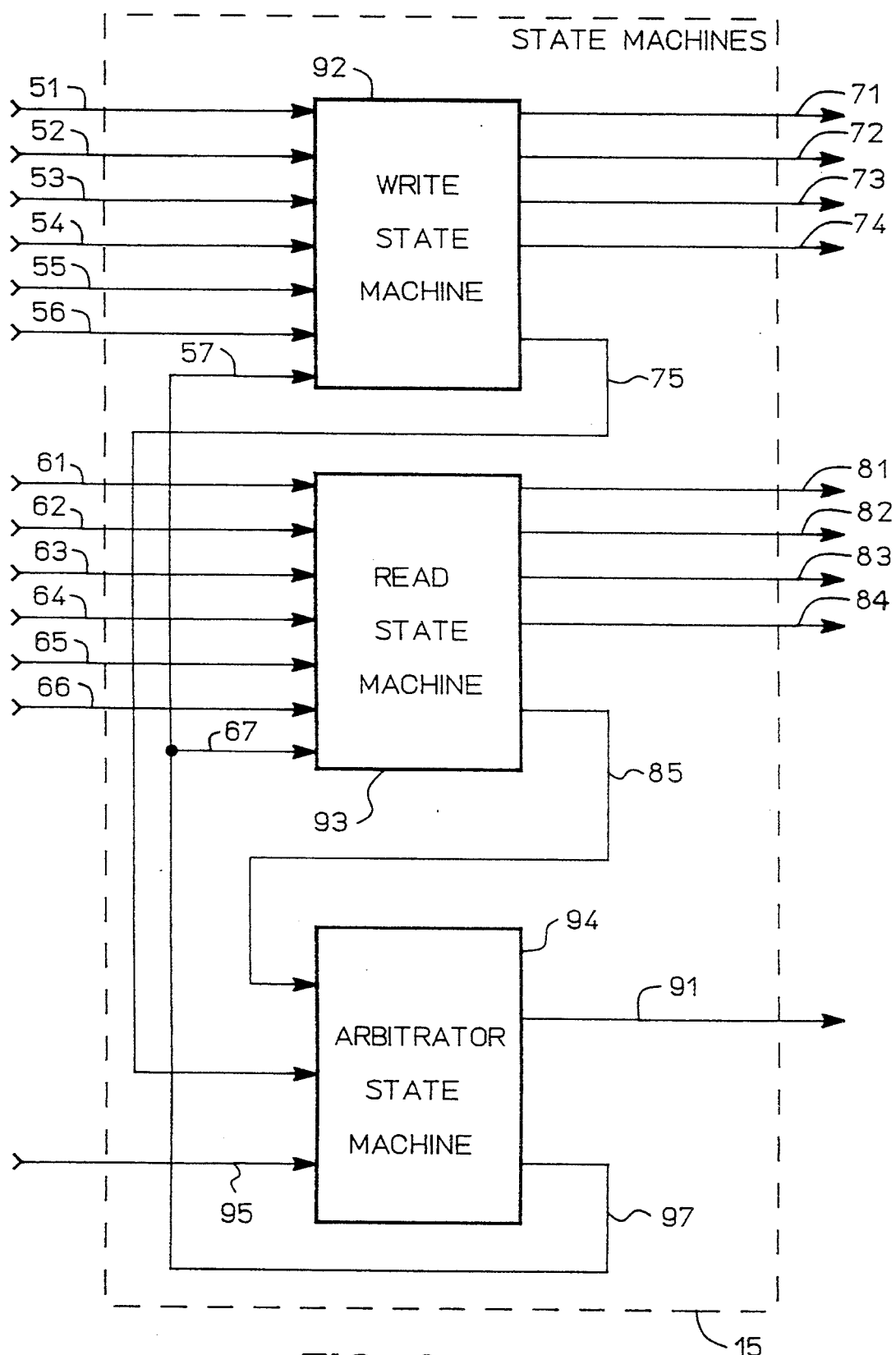
FIG. 3 shows a block diagram of state machines within the input/output device shown in FIG. 2 in accordance with the preferred embodiment of the present invention.

FIG. 3 shows a block diagram of state machines 15. State machines 15 includes three state machines. A write state machine 92 controls writes from EISA bus 4 to I/O device 5. Write state machine 92 has seven inputs. Upon an input line 51, slave control logic 19 places a DMAGO signal which indicates the start of burst mode DMA (DMAGO=1). Upon an input line 52 slave control 19 places a DMARW signals which indicates whether the DMA to be performed is a read from EISA bus 4 or a write to I/O device 5 (For a write DMARW=0; for a write DMARW=1). Upon an input line 53, EISA bus 4 places a DAK signal which indicates a DMA will shortly be in progress over EISA bus 4 (DAK=0). Upon an input line 54, EISA bus 4 places an IOWC signal which is DMA write signal from EISA bus 4 indicating a DMA write is in progress across EISA bus 4. (IOWC=0). On a line 55, a software register within slave control logic 19 places an SRESET signal which performs a software rest of I/O device 5 (SRESET=0). On an input 56, EISA bus 4 places a CEXRDY signal which declares a wait state (CEXRDY=0). On an input line 57, an arbitrator state machine 94 places a DACK signal indicating that within I/O device 5, the DMA process owns local memory data bus 26 (DACK=0).

Write state machine 92 has five outputs. On an output line 71, write state machine 92 sends an ADREN1 signal to address generator 13 which enables address generator 13 to place an address on local memory address bus 24 (ADREN1=0). On an output line 72, write state machine 92 sends a DRQ1 signal to EISA bus 4 which is a request to perform a write DMA over EISA bus 4 (DRQ1=0). On an output line 73, write state machine 92 sends a DWREN signal to decoder control logic 16 which enables decoder control logic 16 to send out a gated BClk signal from EISA bus 4 during DMA write operations (DWREN=1). On an output line 74, write state machine 92 sends a GOTBUS signal to decoder control logic 16 which indicates that a write DMA from EISA bus 4 started but local memory data bus 26 was not owned by the DMA process; therefore, a single data word needs to be transferred from holding registers 14 to local memory 17 (GOTBUS=0). On an output line 75, write state machine 92 sends a DREQ1 signal to arbitrator state machine 94 requesting access to local memory data bus 26 for a DMA transfer (DREQ1=0).

A read state machine 93 controls reads to EISA bus 4 from I/O device 5. Read state machine 93 has seven inputs. Upon an input line 61, slave control logic 19 places the DMAGO signal which indicates the start of burst mode DMA (DMAGO=1). Upon an input line 62, slave control 19 places a DMARW signals which indicates whether the DMA to be performed is a read (DMARW=1) from EISA bus 4 or a write (DMARW=0) to I/O device 5. Upon an input line 63, EISA bus 4 places a DAK signal which indicates a DMA is in progress over EISA bus 4 (DAK=0). Upon an input line 64, EISA bus 4 places an IORC signal which is a read strobe from EISA bus 4 (IORC=0). On a line 65, a software register within slave control logic 19 places an SRESET signal which performs a software rest of I/O device 5 (SRESET=0). On an input 66, EISA bus 4 places a CEXRDY signal which causes a wait state in I/O device 5 (CEXRDY=0). On an input 67, an arbitrator state machine 97 places a DACK signal indicating that within I/O device 5, the DMA process owns local data bus 26 (DACK=0).

Read state machine 93 has five outputs. On an output line 81, read state machine 93 sends an ADREN2 signal to address generator 13 which enables address generator 13 to place an address on local memory address bus 24 (ADREN2=0). On an output line 82, read state machine 93 sends a DRQ2 signal to EISA bus 4 which is a request to perform a read DMA over EISA bus 4 (DRQ2=0). On an output line 83, read state machine 93 sends a CBAEN0 signal to decoder control logic 16 which enables decoder control logic 16 to send out a gated BClk signal from EISA bus 4 during a prime read operation in which a first data word is transferred from local memory 17 to a holding register 14 (CBAEN0=0). On an output line 84, read state machine 93 sends a CBAEN1 signal to decoder control logic 16 which enables decoder control logic 16 to send out a gated BClk signal from EISA bus 4 during a burst read operation (CBAEN1=0). On an output line 85, read state machine 93 sends a DREQ2 signal to arbitrator state machine 94 requesting access to local memory data bus 26 for a DMA transfer (DREQ2=0).

Arbitrator state machine 94 has three inputs. Arbitrator state machine 94 receives the DREQ1 signal from write state machine 92 on line 75. Arbitrator state machine 94 receives the DREQ2 signal from read state machine 93 on line 85. Arbitrator state machine 94 receives on an input line 95 a DREQ signal from LAN controller 20 requesting access to local memory data bus 26 for a transfer of data between FIFO 21 and local memory 17 (DREQ=1).

Arbitrator state machine 94 has two outputs. Arbitrator state machine 94 generates on an output line 97 the DACK signal placed on line 57 and line 67 which indicates DMA may be performed on local memory data bus 26 between local memory 17 and holding registers 14 (DACK=0). Arbitrator state machine 94 also generates an NBACK signal on a line 91 which indicates a data transfer may be performed between local memory 17 and FIFO 21 on local memory data bus 26 (NBACK=0).

Figure 4:
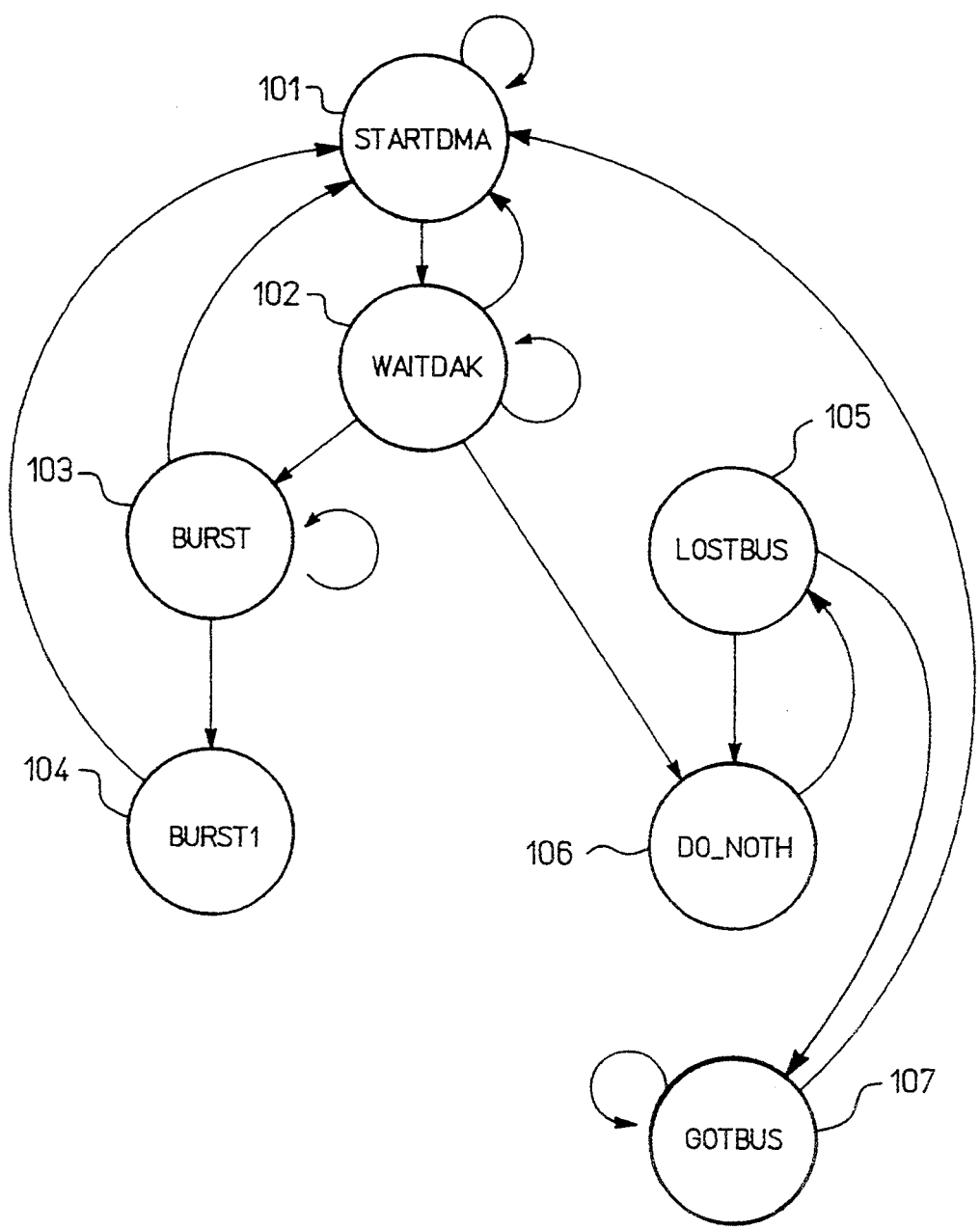
FIG. 4, FIG. 5 and FIG. 6 show state diagrams for the state machines shown in FIG. 3 in accordance with the preferred embodiment of the present invention.

FIG. 4 shows a state diagram for write state machine 92. In a STARTDMA state 101, on output lines 71 through 75, ADREN1 is at logic 1, DRQ1 is at logic 1, DWREN is at logic 1, GOTBUS is at logic 1 and DREQ1 is at logic 1. Write state machine 92 stays in STARTDMA state 101 until signal DMAGO is at logic 1, DMARW is at logic 0 and DAK is at logic 1. Then write state machine 92 transitions to WAITDAK state 102.

In WAITDAK state 102, on output lines 71 through 75, ADREN1 is at logic 1, DRQ1 is at logic 0, DWREN is at logic 1, GOTBUS is at logic 1 and DREQ1 is at logic 1. In WAITDAK state 102, when SRESET equals logic 0, write state machine 92 returns to STARTDMA state 101. In WAITDAK state 102, when DAK equals logic 0 and DACK equals logic 0, write state machine 92 transitions to a BURST state 103. In WAITDAK state 102, when DAK equals logic 0 and DACK equals logic 1, write state machine 92 transitions to a DONOTH state 106. Otherwise write state machine 92 remains in WAITDAK state 102.

In BURST state 103, on output lines 71 through 75, ADREN1 is at logic 0, DRQ1 is at logic 0, DWREN is at logic 1, GOTBUS is at logic 1 and DREQ1 is at logic 0. DMA burst transmission occurs when write state machine 92 is in BURST state 103. In BURST state 103, when DAK equals logic 1, write state machine 92 returns to STARTDMA state 101. In BURST state 103, when IOWC is at logic 0, CEXRDY is at logic 1, DAK is at logic 0 and either DACK is at logic 1 or DMAGO is at logic 0, write state machine 92 transitions to a BURST1 state 104. Otherwise write state machine 92 remains in BURST state 103.

In BURST1 state 104, on output lines 71 through 75, ADREN1 is at logic 0, DRQ1 is at logic 1, DWREN is at logic 1, GOTBUS is at logic 1 and DREQ1 is at logic 0. Write state machine 92 stays in BURST1 state 104, until DAK is equal to logic 1. Then write state machine 92 returns to STARTDMA state 101.

In DONOTH state 106, on output lines 71 through 75, ADREN1 is at logic 1, DRQ1 is at logic 1, DWREN is at logic 0, GOTBUS is at logic 1 and DREQ1 is at logic 1. Write state machine 92 remains in DONOTH state 106 for a cycle of BClk from EISA bus 4. Then write state machine 92 transitions to a LOSTBUS state 105.

In LOSTBUS state 105, on output lines 71 through 75, ADREN1 is at logic 1, DRQ1 is at logic 1, DWREN is at logic 0, GOTBUS is at logic 1 and DREQ1 is at logic 0. This state is entered when I/O device 5 starts a DMA transfer on EISA bus 4, but the DMA transfer loses control of local memory data bus 26. A word of data from EISA bus 4 gets placed in holding registers 14. The write state machine then desires to gain access to local memory data bus 26 in order to transfer this data to local memory 17. In LOSTBUS state 105, when DAK is at logic 1 and DACK is at logic 0, write state machine 92 transitions to a GOTBUS state 107. Otherwise state machine 92 transitions to DONOTH state 106.

In GOTBUS state 105, on output lines 71 through 75, ADREN1 is at logic 0, DRQ1 is at logic 1, DWREN is at logic 1, GOTBUS is at logic 0 and DREQ1 is at logic 0. In GOTBUS state 107, when CEXRDY is at logic 0, write state machine 92 remains in GOTBUS state 107. Otherwise write state machine 92 signals for data to be transferred from holding registers 14 to local memory 17 and returns to STARTDMA state 101.

Figure 5:
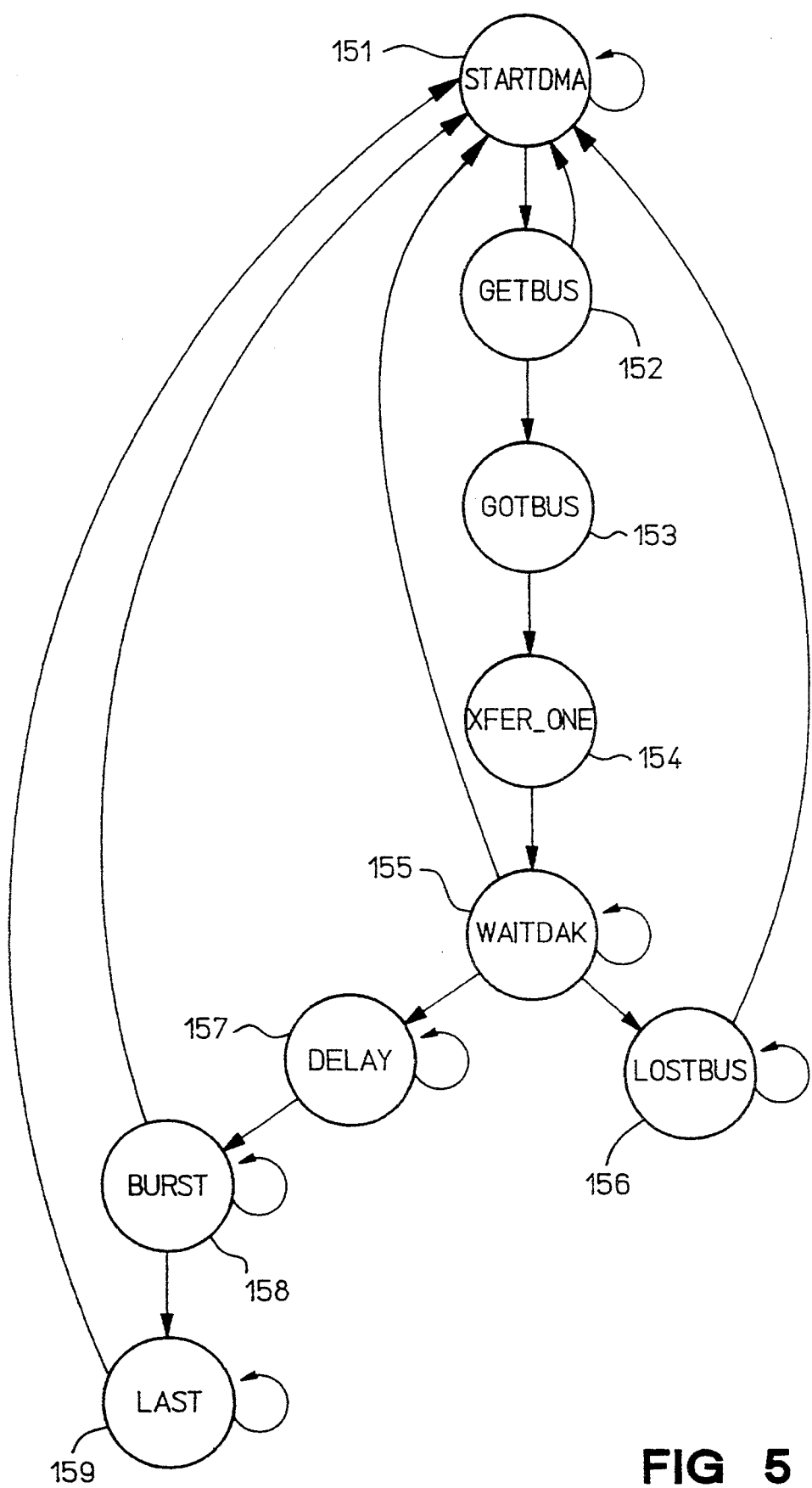

FIG. 5 shows a state diagram for read state machine 93. In a STARTDMA state 151, on output lines 81 through 85, ADREN2 is at logic 1, DRQ2 is at logic 1, CBAEN0 is at logic 1, CBAEN1 is at logic 1 and DREQ2 is at logic 1. Read state machine 92 stays in STARTDMA state 101 until signal DMAGO is at logic 1 and DMARW is at logic 1. Then read state machine 93 transitions to GETBUS state 152.

In GETBUS state 152, on output lines 81 through 85, ADREN2 is at logic 1, DRQ2 is at logic 1, CBAEN0 is at logic 1, CBAEN1 is at logic 1 and DREQ2 is at logic 0. In GETBUS state 152, if DACK is at logic 1, read state machine 93 returns to STARTDMA state 151. In GETBUS state 152, if DACK is at logic 0, read state machine 93 transitions to a GOTBUS state 153.

In GOTBUS state 152, on output lines 81 through 85, ADREN2 is at logic 0, DRQ2 is at logic 1, CBAEN0 is at logic 1, CBAEN1 is at logic 1 and DREQ2 is at logic 0. In GOTBUS state 152, read state machine 93 has control of local memory data bus 26 and is preparing to transfer a word of data from local memory 17 to holding registers 14 in preparation from a read from I/O device 5 to EISA bus 4. Once in GOTBUS state 153, read state machine 93 automatically transitions to a XFERONE state 154.

In XFERONE state 154, on output lines 81 through 85, ADREN2 is at logic 0, DRQ2 is at logic 1, CBAEN0 is at logic 0, CBAEN1 is at logic 1 and DREQ2 is at logic 0. In XFERONE state 154, a word of data from local memory 17 is transferred to holding registers 14. Once in XFERONE state 154, read state machine 93 automatically transitions to a WAITDAK state 155.

In WAITDAK state 155, on output lines 81 through 85, ADREN2 is at logic 1, DRQ2 is at logic 0, CBAEN0 is at logic 1, CBAEN1 is at logic 1 and DREQ2 is at logic 1. In WAITDAK state 155, if DAK is at logic 1, read state machine 93 remains in WAITDAK state 155. If DAK equals logic 0 and DACK equals logic 1, read state machine 93 transitions to a LOSTBUS state 156. If DAK equals logic 0 and DACK equals logic 0, read state machine 93 transitions to a DELAY state 157.

In LOSTBUS state 156, on output lines 81 through 85, ADREN2 is at logic 1, DRQ2 is at logic 1, CBAEN0 is at logic 1, CBAEN1 is at logic 1 and DREQ2 is at logic 1. When read state machine 93 is in this state, it means control of local memory data bus 26 has been lost. Therefore, read state machine 93 remains in this state until the data word in holding registers 14 is transferred to EISA bus 104, that is, while DAK remains at logic 0. When DAK is at logic 1, read state machine 93 returns to STARTDMA state 151.

In DELAY state 157, on output lines 81 through 85, ADREN2 is at logic 0, DRQ2 is at logic 0, CBAEN0 is at logic 1, CBAEN1 is at logic 1 and DREQ2 is at logic 0. Read state machine 93 remains in DELAY state 157 while. IORC equals logic 1, waiting for the read strobe from EISA bus 4. When IORC equals logic 0, read state machine 93 transitions to a BURST state 158.

In BURST state 158, on output lines 81 through 85, ADREN2 is at logic 0, DRQ2 is at logic 0, CBAEN0 is at logic 1, CBAEN1 is at logic 0 and DREQ2 is at logic 0. In BURST state 158, a burst read transfer is being performed over EISA bus 4. When DAK equals logic 1 or when DMAGO equals logic 1, CEXRDY equals logic 1 and IORC equals logic 0, then read state machine returns to STARTDMA state 151. When DMAGO equals logic 1, DACK equals logic 1, DAK equals logic 0, CEXRDY equals logic 1 and IORC equals logic 0, then read state machine 93 transitions to a LAST state 159. In LAST state 159, on output lines 81 through 85, ADREN2 is at logic 0, DRQ2 is at logic 1, CBAEN0 is at logic 1, CBAEN1 is at logic 0 and DREQ2 is at logic 0. Read state machine 93, remains in this state until the data word in holding registers 14 is transferred to EISA bus 104, that is, while DAK remains at logic 0. When DAK is at logic 1, read state machine 93 returns to STARTDMA state 151.

Figure 6:
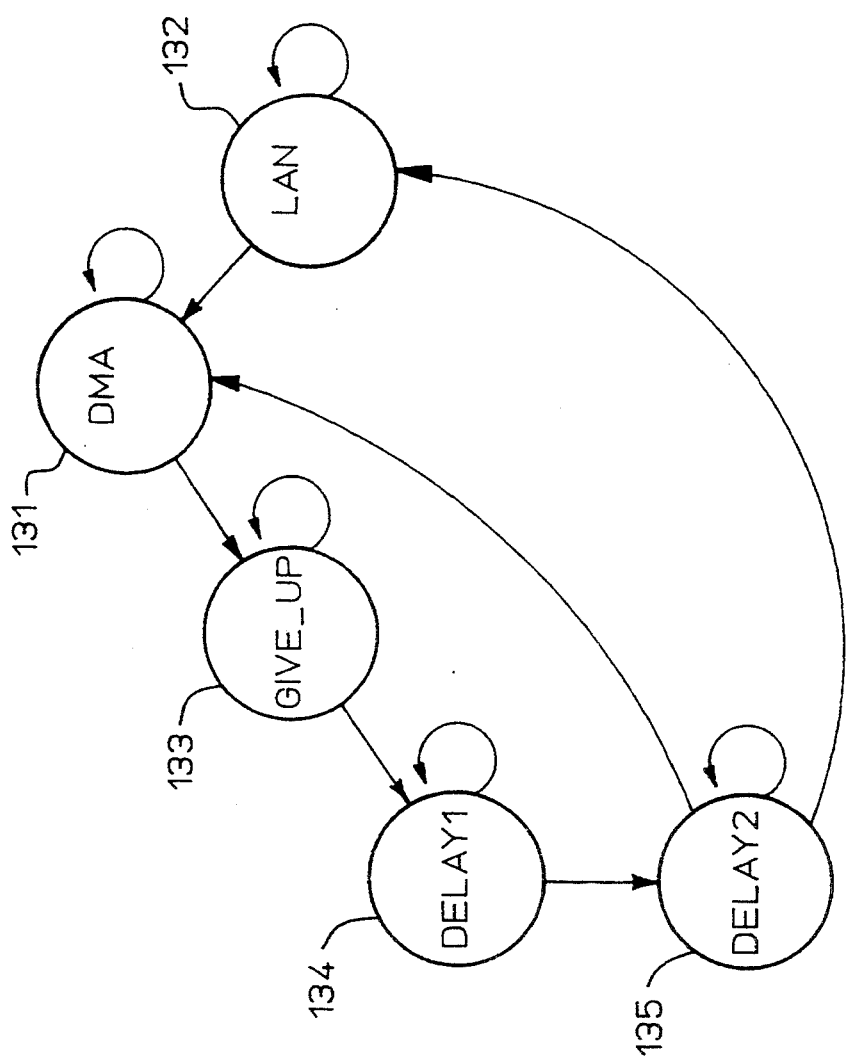

FIG. 6 shows a state diagram for arbitrator state machine 94. In a DMA state 131, on output lines 91 and 97, DACK is at logic 0 and NBACK is at logic 1. In this state DMA transfers may be performed between local memory 17 and holding registers 14. Arbitrator state machine 94 remains in this state while DREQ is at logic 0. When DREQ is at logic 1, arbitrator state machine 94 transitions to a GIVEUP state 133.

In GIVEUP state 133, on output lines 91 and 97, DACK is at logic 1 and NBACK is at logic 1. While either DREQ1 or DREQ2 remains at logic 0, arbitrator state machine 94 remains in GIVEUP state 133. When both DREQ1 and DREQ2 are at logic 1, arbitrator state machine 94 transitions to a DELAY1 state 34.

In DELAY1 state 134, on output lines 91 and 97, DACK is at logic 1 and NBACK is at logic 1. While either DREQ1 or DREQ2 remains at logic 0, arbitrator state machine 94 remains in DELAY state 134. When both DREQ1 and DREQ2 are at logic 1, arbitrator state machine 94 transitions to a DELAY2 state 135.

In DELAY2 state 135, on output lines 91 and 97, DACK is at logic 1 and NBACK is at logic 1. While either DREQ1 or DREQ2 remains at logic 0, arbitrator state machine 94 remains in DELAY state 135. When both DREQ1 and DREQ2 are at logic 1, and DREQ is at logic 0, arbitrator state machine 94 returns to DMA state 131. When both DREQ1 and DREQ2 are at logic 1, and DREQ is at logic 1, arbitrator state machine 94 transitions to an LAN state 132.

In LAN state 132, on output lines 91 and 97, DACK is at logic 1 and NBACK is at logic 0. In this state, LAN controller 20 is able to transfer data between FIFO 21 and local memory 17 on local memory data bus 26. Arbitrator state machine 94 remains in this state while DREQ is at logic 1. When DREQ is at logic 0, arbitrator state machine 94 returns to DMA state 131.

Figure 7:
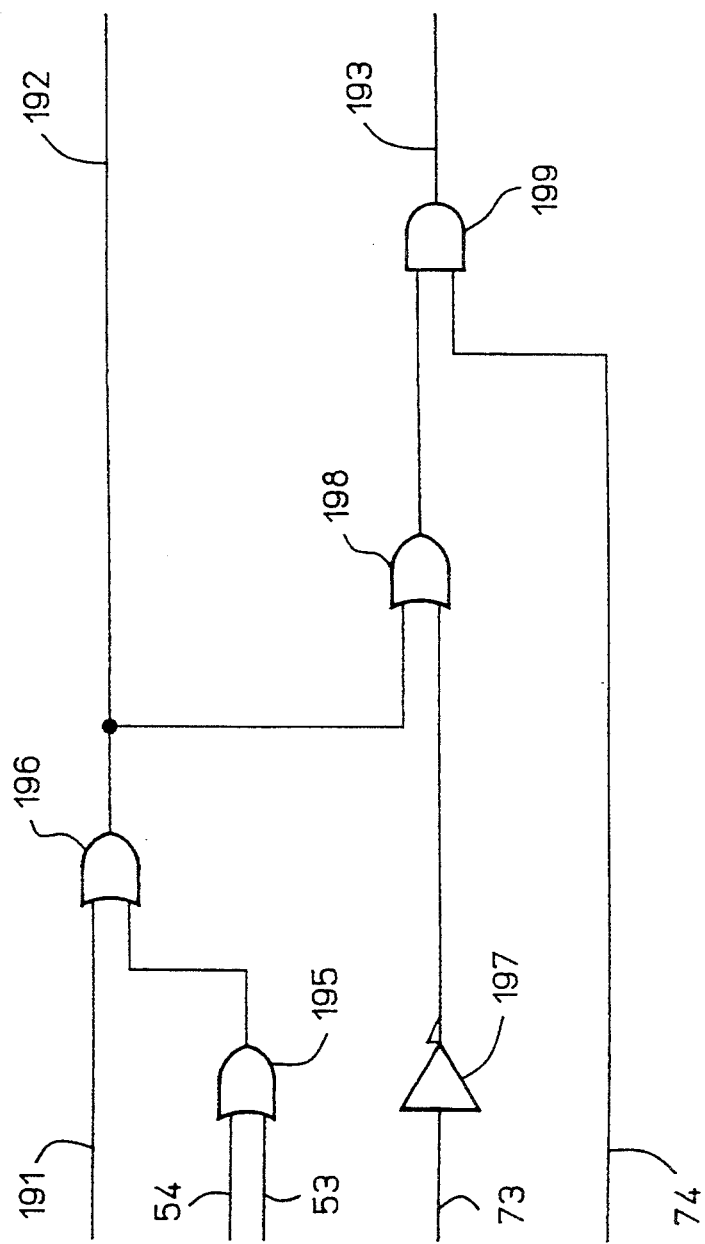
FIG. 7 shows decoder control logic within the input-/output device shown in FIG. 2 in accordance with the preferred embodiment of the present invention.

FIG. 7 shows circuitry within decoder control logic 16 which generates a CAB signal on a line 192 used to clock holding register 14 during an EISA DMA burst write. Decoder control logic 16 also generates an LCAB signal, which is a gated CAB signal, on a line 193. The LCAB signal is used to strobe local memory 17, via decoder control logic 16, during an EISA DMA burst write. The circuitry includes a logical OR gate 195, a logical OR gate 196, a logical NOT gate 197, a logical OR gate 198 and a logical AND gate 199, connected as shown. The circuitry receives as input IOWC on line 54, DAK on line 53, DWREN on line 73 and GOTBUS on line 74. The BClk signal from EISA bus 4 is placed on a line 191. BClk is forwarded to output line 192 when IOWC is at logic 0 and DAK is at logic 0. BClk is forwarded to output line 193 when IOWC is at logic 0, DAK is at logic 0, DWREN is at logic 1, and GOTBUS is at logic 1.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. In a computing system, an input/output interface device coupled between an input/output bus and an external data port, the input/output interface device comprising:

data storage means;

a local bus connected to the data storage means;

controller means, coupled to the local bus and to the external data port, for transferring data from the data storage means over the local bus to the external data port, and for transferring data from the external data port over the local bus to the data storage means;

direct memory access means, coupled to the local bus and to the input/output bus, for transferring data from the data storage means over the local bus to the input/output bus, and for transferring data from the input/output bus over the local bus to the data storage means, the direct memory access means including a holding register, coupled to the local bus and to the input/output bus, for buffering data being transferred between the data storage means and the input/output bus; and, clock source, coupled to the direct memory access means, for providing a first clock signal to the direct memory access means;

wherein the input/output bus supports burst transactions and during burst transactions, timing for data transfer over the input/output bus is controlled using the first clock signal and timing for data transfer over the local bus between the data storage means and the holding register also is controlled using the first clock signal.

2. In a computing system having an input/output interface device coupled between an input/output bus and an external data port, a method for transferring data between the input/output bus and the external data port, the method comprising the steps of:

(a) transferring, by a controller over a local bus within the input/output interface device, data between the external data port and an internal memory; and, (b) transferring, by direct memory access circuitry within the input/output interface device over the local bus, data between the internal memory and the input/output bus in synchronization with data transfer across the input/output bus so that during burst data transfers, data transfer over the input/output bus is synchronized to a same clock signal used to synchronize data transfer between a holding register and the internal memory, the holding register being within the input/output interface device, being connected to the input/output bus and being used to buffer transferred data.

3. In a computing system, an input/output interface device coupled between an input/output bus and an external data port, the input/output interface device comprising:

data storage means;

a local bus connected to the data storage means;

controller means, coupled to the local bus and to the external data port, for transferring data from the data storage means over the local bus to the external data port, and for transferring data from the external data port over the local bus to the data storage means;

direct memory access means, coupled to the local bus and to the input/output bus, for transferring data from the data storage means over the local bus to the input/output bus, and for transferring data from the input/output bus over the local bus to the data storage means, wherein the direct memory access means includes a holding register, coupled to the local bus and to the input/output bus, for buffering data being transferred between the data storage means and the input/output bus, first state machine means for controlling writes of data from the input/output bus to the data storage means, second state machine means for controlling reads of data to the input/output bus from the data storage means, and third state machine means, coupled to the first state machine means, the second state machine means and the controller means, for arbitrating access to the data storage means by the controller means and the direct memory access means; and, clock source, coupled to the direct memory access means, for providing a first clock signal to the direct memory access means;

wherein the input/output bus supports burst transactions and during burst transactions, timing for data transfer over the input/output bus is controlled using the first clock signal and timing for data transfer over the local bus between the data storage means and the holding register also is controlled using the first clock signal.

4. The input/output interface device of claim 3, wherein the input/output bus is an Extended Industry Standard Architecture and the external data port is for a local area network.

5. The input/output interface device of claim 3, wherein the direct memory access means additionally includes an address generator, coupled to the data storage means, the first state machine means and the second state machine means, for generating address during direct memory access transfers within the input/output interface device.

6. The input/output interface device of claim 3, wherein when both the direct memory access means and the controller means are not requesting access to the data storage means, the third state machine grants to the direct memory access means access to the data storage means.

7. In a computing system having an input/output interface device coupled between an input/output bus and an external data port, a method for transferring data between the input/output bus and the external data port, the method comprising the steps of:

(a) transferring, by a controller within the input/output interface device, data between the external data port and an internal memory;

(b) transferring, by direct memory access circuitry within the input/output interface device, data between the internal memory and the input/output bus in synchronization with data transfer across the input/output bus so that during burst data transfers, data transfer over the input/output bus is synchronized to a same clock signal used to synchronize data transfer between a holding register and the internal memory, the holding register being within the input/output interface device, being connected to the input/output bus and being used to buffer transferred data; and, (c) arbitrating between steps (a) and (b) so that the controller does not transfer data between the external data port and the internal memory simultaneous to the direct memory access circuitry transferring data between the internal memory and the input/output bus, the arbitrating being done by an arbitrator within the input/output interface device.

8. The method of claim 7 wherein step (c) includes the substeps of:

(c.1) when both the direct memory access circuitry and the controller are not requesting access to the internal memory, granting to the direct memory access circuitry access to the internal memory; and, (c.2) when the controller requests access to the internal memory, granting the controller access to the internal memory after allowing for delay sufficient for the direct memory access circuitry to complete any current data transfer between the internal memory and the input/output bus.

9. The method of claim 8 wherein in step (b) writing data from the input/output bus to the internal memory includes the following substeps performed by a write controller within the input/output interface device:

(b.1) sending to the input/output bus a request to start a data transfer;

(b.2) when the input/output bus grants the request to start a data transfer and the arbitrator is granting to the direct memory access circuitry access to the internal memory, performing a burst data transfer of data from the input/output bus to the internal memory; and, (b.3) when the input/output bus grants the request to start a data transfer and the arbitrator is not granting to the direct memory access circuit access to the internal memory, waiting for the arbitrator to grant to the direct memory access circuit access to the internal memory and when the arbitrator grants to the direct memory access circuit access to the internal memory, transferring a single data word to the internal memory from the holding register within the input/output interface device.

10. The method of claim 8 wherein in step (b) reading data from the internal memory to the input/output bus includes the following substeps performed by a read controller within the input/output interface device:

(b.1) transferring a single data word from the internal memory to the holding register within the input/output interface device;

(b.2) sending to the input/output bus a request to start a data transfer;

(b.3) when the input/output bus grants the request to start a data transfer and the arbitrator is granting to the direct memory access circuitry access to the internal memory, performing a burst data transfer of data from the internal memory to the input/output bus beginning with the single data word; and, (b.4) when the input/output bus grants the request to start a data transfer and the arbitrator is not granting to the direct memory access circuit access to the internal memory, transferring the single data word from the holding register to the input/output bus.

* * * * *